Figure 1:
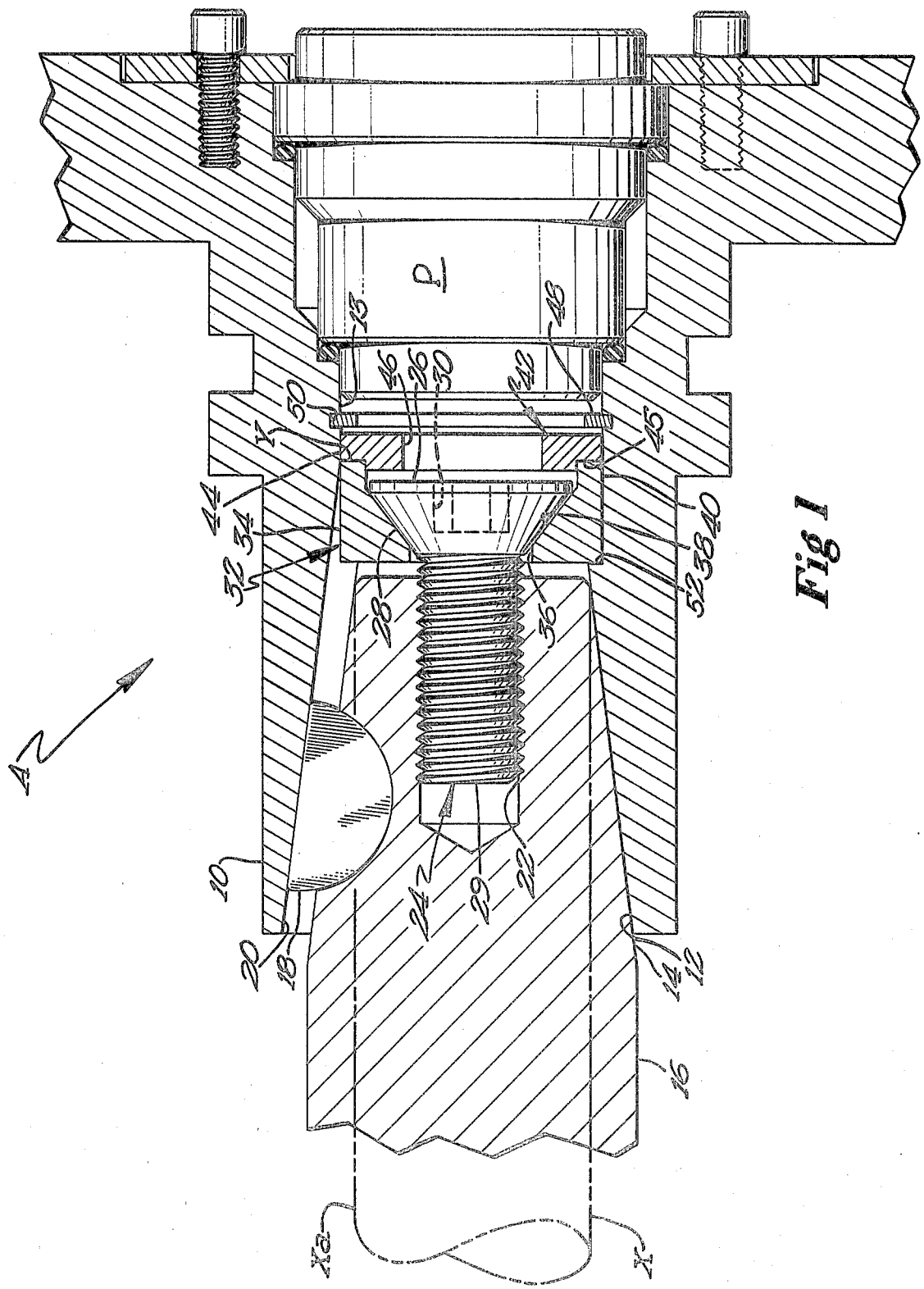

United States Patent [19]

Rechkin

[11] 4,402,625

[45] Sep. 6, 1983

[54] APPARATUS FOR CONNECTION AND DISCONNECTION OF A HUB TO AND FROM AN INTERNALLY THREADED SHAFT

[75] Inventor: Mark Rechkin, Minneapolis, Minn.

[73] Assignee: Horton Manufacturing Co., Inc., Minneapolis, Minn.

[21] Appl. No.: 271,521

[22] Filed: Jun. 8, 1981

[51] Int. Cl.³ .............................................. F16B 1/00
[52] U.S. Cl. ......................................... 403/7; 403/16
[58] Field of Search ................. 29/256, 264, 263, 234, 29/272; 81/53.2; 403/21, 16, 260, 361, 258, 252, 260, 1, 6, 7; 301/108 S, 105 R, 108 SC; 192/110 S

[56] References Cited

U.S. PATENT DOCUMENTS

| | | | |
|---|---|---|---|
| 3,143,366 | 8/1964 | Nichols | 403/16 |
| 3,279,870 | 10/1966 | Janiszewski | 403/260 X |
| 3,600,789 | 8/1971 | Buberniak | 29/264 |
| 4,022,536 | 5/1977 | Piepho et al. | 403/16 |

Primary Examiner—Harold D. Whitehead
Assistant Examiner—Steven P. Schad
Attorney, Agent, or Firm—Wicks & Nemer

[57] ABSTRACT

A hub for a clutch having a bore and an apparatus for connecting the bore of the hub to a shaft end having a threaded axial hole and disconnecting the hub from the shaft, the improvement in the apparatus for connection and disconnection of the hub from the shaft including the hub having a stop shoulder formed in the bore and a bolt having a recess in the head thereof together with a mounting washer positioned against the stop shoulder. A bolt is positioned through the washer with the head of the bolt in rotational contact with the mounting washer. A containment ring is secured to the mounting washer to prevent displacement of the bolt head from the mounting washer. A bolt containment ring is secured in the bore of the hub adjacent the containment ring to prevent displacement of the bolt, mounting washer and containment ring from the bore whereby the bolt may be engaged with the threaded hole of the shaft to thereby removeably mount the hub on the shaft end.

6 Claims, 1 Drawing Figure

APPARATUS FOR CONNECTION AND DISCONNECTION OF A HUB TO AND FROM AN INTERNALLY THREADED SHAFT

SUMMARY

The invention relates broadly to the connection and removal of a hub to and from a shaft and more particularly to a hub such as found in a clutch, a brake, or a pulley and having a bore for connection with the end of a shaft.

Heretofore, hubs with bores having been removed from shaft ends by means of auxiliary tools existing separate and apart from the hub and shaft.

It is an object of the invention to provide a dual performing apparatus contained within a hub which not only connects and maintains the hub to the shaft but which also provides a feature for removal of the hub from a shaft.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the invention idea wherein like numerals refer to like parts throughout.

In the drawings forming part of this application:

FIG. 1 is a sectional view of a hub of a clutch and an end portion of a shaft in connection with a bore of the hub by means of an apparatus providing a removable connection of the hub to and from the shaft embodying the invention.

Referring to the drawings in detail, the apparatus A for removeable connection of a hub to a shaft includes the cylindrical hub 10 having the tapered axial bore 12 into which the tapered end 14 of the shaft 16 is mounted with the addition of the key 18 in the keyway 20. The tapered bore 12 terminates inwardly in the constant axial bore 13. The end of the shaft is formed with the threaded axial hole 22 which receives the bolt 24 having the head 26 with the frustoconical under surface 28 and threaded shank portion 29. The head of the bolt is formed with the conventional recess 30 for engagement of a tool for actuating the bolt for removal or attachment of the shaft. The apparatus works equally well with a straight shaft and bore illustrated by the broken lines X and Xa in FIG. 1.

The numeral 32 designates a mounting washer for the bolt head 26 which includes the circular body portion 34 formed with the axial hole 36 for receipt of the threaded shank portion of the bolt. The axial hole 36 terminates inwardly in the axial frustoconical recess 38 which in turn terminates in the internal annular shoulder 40. The inner diameter of the shoulder 40 is such that the head of the bolt may be rotated within the same.

Further provided is the bolt containment and cover ring 42 including the annular body 44 having the recess 45 into which the annular shoulder of the mounting washer 32 fits at point Y. The ring 42 includes the axial hole 46 through which a tool is inserted for engagement with the recess 30 of the bolt head 26 and actuation of the bolt for engagement or disengagement of the hub from the shaft.

The numeral 48 designates a retainer ring anchored in bore 13 by insertion of the ring into annular groove 50 formed in the axial opening 13 of the hub.

The apparatus is formed and assembled as follows: The plug P is removed from the hub and then the mounting washer 32 is positioned in the bore 13 of the hub and against the shoulder 52. The bolt shank 29 is then extended through the hole 36 of the mounting washer, and the containment ring 42 is positioned against the mounting washer 32 and secured thereto by "Locktite" (T.M.) or other conventional securing material. The washer 32 and ring 42 are held within the bore 13 by the snap retainer ring 48 snapped into the annular groove 50.

The hub now has the apparatus self-contained and is now ready to be mounted on the end of the shaft 16 by inserting a tool through the snap ring 48, the containment ring 42 and into engagement with the recess 30 of the bolt. The shaft is now extended into the bore and the threaded shank 29 engaged with the threads of the axial hole 22. The tool is rotated whereby the bolt draws the shaft up tightly in the bore and in abutment with the fixed containment ring 32 as a stop thereby mounting the hub on the shaft without the use of any external tools.

To remove the hub from the tapered shaft, a tool is inserted through the hole 46 and into the recess 30 of the head of the bolt and turned counterclockwise on a right handed threaded bolt whereby the hub is forced from the tapered shaft. As the bolt is turned to effect removal of the shaft, the head of the bolt initially backs up and contacts the bolt containment ring 42. With further screwing of the bolt, the bolt and containment ring 42 cannot move axially due to the ring 42 abutting anchored ring 48 whereby the hub is removed from the shaft, the bolt remaining with the hub.

Having thus described the invention, what is claimed as new and desired to be secured by Letters Patent is:

1. In a hub having a bore and an apparatus for connecting the base of the hub to a shaft end having a threaded axial hole and disconnecting the hub from the shaft, the improvement in said apparatus for connection and disconnection of the hub from the shaft, said improvement including
    (a) said hub having stop means formed in said bore,
    (b) a bolt having a head with a recess therein,
    (c) means for receiving the head of said bolt for rotation and against said stop means,
    (d) means connected to said receiving means for preventing the displacement of the head of the bolt from said receiving means as the bolt is static and as the bolt is rotated, said preventing means including a ring secured to said receiving means having an internal diameter less than that of the head of said bolt,
    (e) means for retaining said receiving means and preventing means in said bore thereby allowing rotation of said bolt in one direction by engagement of the recess in the head of the bolt by a tool for causing the threaded end to engage the threads of the axial hole of the shaft to draw the shaft end into the bore and allowing rotation of the bolt in the other direction to force said shaft end from said hub bore.

2. The device of claim 1 in which said stop means includes an annular shoulder.

3. The device of claim 1 in which said means for receiving the head of said bolt for rotation includes (a) an annular washer having a frustoconical inner surface which mates with (b) a frustoconical surface formed on the underside of the head of said bolt.

4. The device of claim 1 in which said means for retaining said receiving means and preventing means in said bore includes (a) a ring secured in (b) an annular groove formed in the inner surface of said bore.

5. In a hub having a bore and an apparatus for connecting the base of the hub to a shaft end having a threaded axial hole and disconnecting the hub from the shaft, the improvement in said apparatus for connection and disconnection of the hub from the shaft, said improvement including (a) said hub having stop means formed in said bore, (b) a bolt having a head with a recess therein, (c) means for receiving the head of said bolt for rotation and against said stop means, (d) means connected to said receiving means for preventing the displacement of the head of the bolt from said receiving means as the bolt is static and as the bolt is rotated, (e) means for retaining said receiving means and preventing means in said bore thereby allowing rotation of said bolt in one direction by engagement of the recess in the head of the bolt by a tool for causing the threaded end to engage the threads of the axial hole of the shaft to draw the shaft end into the bore and allowing rotation of the bolt in the other direction to force said shaft end from said hub bore, (f) wherein said stop means includes an annular shoulder, (g) wherein said means for receiving the head of said bolt for rotation includes (1) an annular washer having a frustoconical inner surface which mates with (2) a frustoconical surface formed on the underside of the head of said bolt, and (h) wherein said preventing means includes a ring secured to said receiving means having an internal diameter less than that of the head of said bolt.

6. The device of claim 5 in which said means for retaining said receiving means and preventing means in said bore includes (a) a ring secured in (b) an annular groove formed in the inner surface of said bore.

* * * * *